(12) United States Patent
Tebby

(10) Patent No.: US 10,221,948 B2
(45) Date of Patent: Mar. 5, 2019

(54) ACTIVE SURFACE FOR A PACKING SEAL INTENDED FOR A SHAFT SEALING SYSTEM

(71) Applicant: AREVA NP, Courbevoie (FR)

(72) Inventor: Zoé Tebby, Haspres (FR)

(73) Assignee: AREVA NP, Courbevoie (FR)

( * ) Notice: Subject to any disclaimer, the term of this patent is extended or adjusted under 35 U.S.C. 154(b) by 367 days.

(21) Appl. No.: 15/022,182

(22) PCT Filed: Jul. 22, 2014

(86) PCT No.: PCT/EP2014/065727
§ 371 (c)(1),
(2) Date: Mar. 15, 2016

(87) PCT Pub. No.: WO2015/011142
PCT Pub. Date: Jan. 29, 2015

(65) Prior Publication Data
US 2016/0230891 A1      Aug. 11, 2016

(30) Foreign Application Priority Data

Jul. 24, 2013   (FR) .................................... 13 57301

(51) Int. Cl.
| *F16J 15/16* | (2006.01) |
| *G21C 15/243* | (2006.01) |
| *G21D 1/04* | (2006.01) |
| *F16J 15/34* | (2006.01) |

(52) U.S. Cl.
CPC ............ *F16J 15/16* (2013.01); *F16J 15/3496* (2013.01); *G21C 15/243* (2013.01); *G21D 1/04* (2013.01); *Y02E 30/40* (2013.01)

(58) Field of Classification Search
USPC ....... 277/404, 405, 406, 650, 652, 653, 345, 277/500; 428/141, 336, 408, 457, 698
See application file for complete search history.

(56) References Cited

U.S. PATENT DOCUMENTS

| 4,841,408 A | 6/1989 | Matsunaga et al. |
| 4,871,297 A * | 10/1989 | Boes ..................... F04D 29/126 |
| | | 277/406 |
| 6,149,160 A | 11/2000 | Stephens et al. |
| 6,212,997 B1 * | 4/2001 | McCollough ......... F04B 53/144 |
| | | 417/554 |

(Continued)

FOREIGN PATENT DOCUMENTS

| DE | 202006006425 | * 6/2006 |
| EP | 0675303 | * 10/1995 |

(Continued)

*Primary Examiner* — Archene A Turner
(74) *Attorney, Agent, or Firm* — Greer, Burns & Crain, Ltd.

(57) ABSTRACT

A packing seal is provided for a system for sealing the shaft of a primary motor-driven pump unit of a nuclear reactor, intended to ensure sealing between the primary circuit and the atmosphere. The packing seal includes a rotary active surface and a floating active surface, and a face of the floating active surface and/or the rotary active surface is covered by a protective layer made from a material having surface energy greater than 30 $mJ/m^2$ and an electron donor component less than 15 $mJ/m^2$.

11 Claims, 2 Drawing Sheets

(56) References Cited

U.S. PATENT DOCUMENTS

| | | | |
|---|---|---|---|
| 6,946,096 B2* | 9/2005 | Giesler | B22F 7/008 |
| | | | 419/10 |
| 2009/0060408 A1* | 3/2009 | Nagasaka | C04B 41/009 |
| | | | 384/625 |
| 2011/0101616 A1* | 5/2011 | Teshima | F16J 15/3424 |
| | | | 277/500 |
| 2012/0024608 A1* | 2/2012 | Lu | E21B 10/25 |
| | | | 384/94 |
| 2013/0154192 A1* | 6/2013 | Sitko | F16J 15/16 |
| | | | 277/500 |
| 2013/0313785 A1 | 11/2013 | Otschik et al. | |

FOREIGN PATENT DOCUMENTS

| | | | |
|---|---|---|---|
| FR | 2556070 | * | 6/1985 |
| JP | 60-021487 | * | 2/1985 |
| WO | 2013/035503 | * | 3/2013 |

* cited by examiner

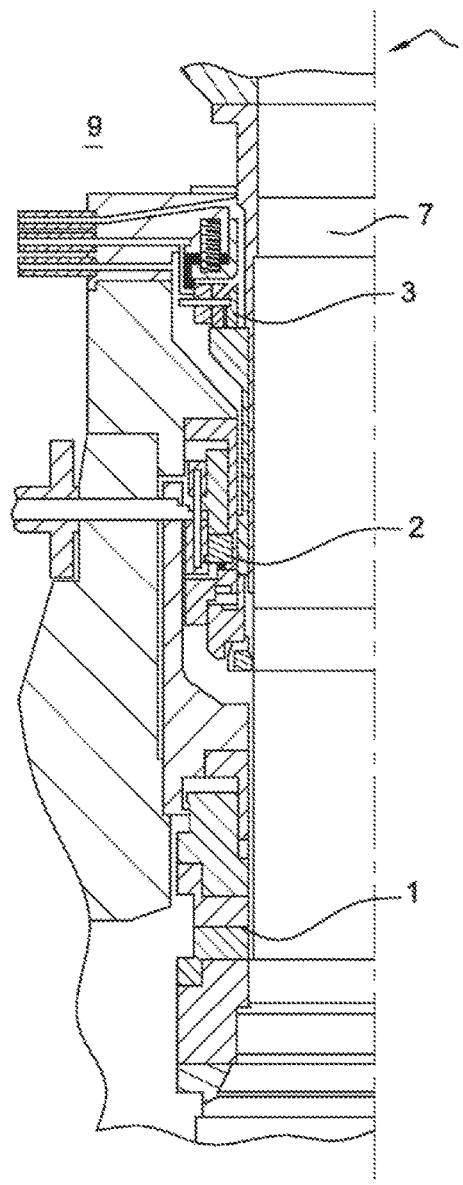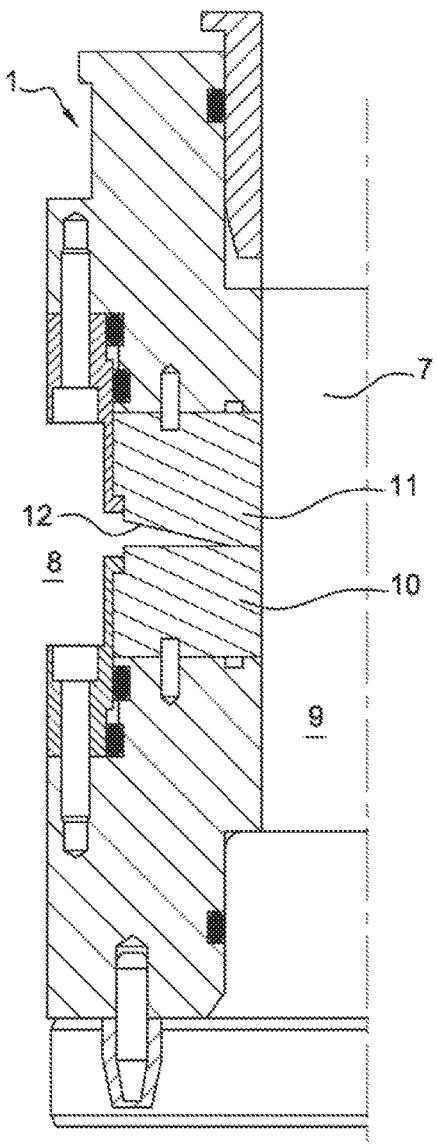
Fig. 1　　　Fig. 2
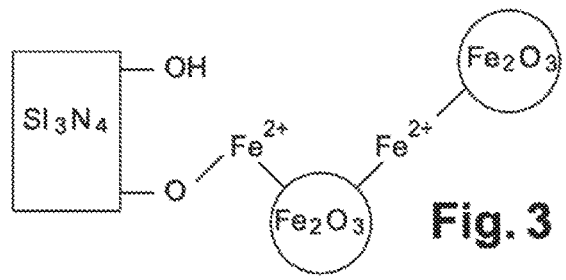
Fig. 3

ACTIVE SURFACE FOR A PACKING SEAL INTENDED FOR A SHAFT SEALING SYSTEM

BACKGROUND

The field of the invention is the one of primary motor-driven pump units of pressurized water nuclear reactors (EPR). More precisely, the present invention relates to the active surfaces, also referred to as active faces, of the main mechanical packing seal of the primary motor-driven pump unit.

In nuclear reactors, the primary pump generates the water circulation in the primary circuit of pressurized water reactors. A shaft dynamic sealing system ensures the sealing between the primary circuit and the atmosphere. This shaft sealing system is a controlled leakage system. It includes three seals disposed in series. Each seal includes two active surfaces which ensure the main sealing. One of the active surfaces, referred to as a rotary active surface, is mounted in a rotary assembly attached to the shaft, the other active surface, known as a floating active surface, is mounted in a non-rotary assembly but which is free to be displaced axially to follow the possible axial displacements of the shaft.

Seal n°1 ensures the greatest part of the pressure drop between the primary circuit and the atmosphere. It is of the hydrostatic type, with a water film of a thickness in the order of 10 µm. The particular geometry of the faces of the active surfaces ensuring the main sealing enables, at shutdown as in rotation, the automatic adjustment of their spacing which only depends on the ΔP of the seal. The active surfaces were initially made of alumina, but they are more and more often made of silicon nitride, which is more abrasion-resistant.

Seal n°1 operates with a controlled leakage rate, in the order of 600 l/h in operation, thanks to the specific profile machined on its active faces. It makes it possible to switch from a pressure of 155 bars to a pressure of about 2 bars.

However, in the seals n°1 of prior art, it is noticed that a significant deposition of iron oxide fouls the active faces and modifies the gradient of these faces, resulting in a modification in the leakage rate.

Document "Deposition of hematite particles on alumina seal faceplates of nuclear reactor coolant pumps-laboratory experiments and industrial feedback" by Gregory Lefèvre, Ljiljana S. Zivkovic and Anne Jaubertie, Hem. Ind., 2012, explains that this fouling phenomenon is due to a two-steps phenomenon:
  the particles are transported from the solution towards the active surfaces by hydrodynamic, electrophoretic and thermophoretic phenomena;
  they then adhere to the sealing faces by physico-chemical interactions. In prior art, these interactions are considered as been essentially due to the fact that the hematite particles are positively charged, whereas the faces of the active surfaces are negatively charged.

To overcome this problem, document U.S. Pat. No. 7,287,756 suggests the addition of a catalyst at the face of the active surfaces. This catalyst is preferably a following component or a mixture of the following components: rhenium, ruthenium, rhodium, palladium, silver, osmium, iridium, platinum, gold. From document U.S. Pat. No. 7,287,756, iron is present in solution as FeOOH (goethite) and as $Fe^{2+}$ ions. Goethite would deposit at the face of the packing seals. In parallel, the $Fe^{2+}$ ions would be oxidized by dioxygen into $Fe^{3+}$ ions which would precipitate and consolidate the deposition. The deposition would then evolve into hematite ($Fe_2O_3$). The use of catalysts would make it possible to dissociate the dihydrogen therein, resulting in reducing the chemical potential, to prevent $Fe^{2+}$ ions from oxidizing and to reduce the present $Fe^{3+}$ ions into $Fe^{2+}$, therefore preventing the oxide deposition from occurring.

The applicant has identified another mechanism for forming an oxide deposition on the faces of the active surfaces. We therefore suggest a solution which takes this forming mechanism into account.

SUMMARY

The aim of the invention is to overcome the drawbacks of the state of the art by providing an efficient solution to prevent the fouling of the active surfaces of seal n°1 of the shaft sealing system of the primary motor-driven pump unit of a nuclear reactor.

To this end, the invention intends to cover the face of the active surfaces of seal n°1 with a coating which prevents the $Fe^{2+}$ ions from adsorbing at the face of the active surfaces.

Indeed, the applicant's experiments have shown that the simultaneous presence of $Fe^{2+}$ and of hematite particles was necessary for forming the deposition. The deposition is only performed in the fields of the Pourbaix diagram where $Fe^{2+}$ is the thermodynamically stable species, the kinetics resulting in hematite particles being still present. Moreover, it was demonstrated that the deposition occurred on a low energy face, which is a poor electron donor. It was for example observed on PFA, perfluoroalkoxy, having a total surface energy less than 20 $mJ/m^2$ and an electron donor component less than 5 $mJ/m^2$. Deposition also occurs on a high energy surface which is a strong electron donor component such as silicon nitride which has a total surface energy of 50 $mJ/m^2$ and an electron donor component of 56 $mJ/m^2$. However, deposition is strongly delayed on a high energy microcrystalline diamond face (50 $mJ/m^2$) with a low electron donor component (3 $mJ/m^2$).

More precisely, the invention provides an active surface for a shaft sealing system of primary motor-driven pump units of nuclear reactors intended to ensure the sealing between the primary circuit and the atmosphere, a face of the active surface being covered with a protective layer made of a material having a surface energy greater than 30 $mJ/m^2$ and an electron donor component less than 15 $mJ/m^2$.

Covering the face of the active surfaces with a material having a surface energy greater than 30 $mJ/m^2$ and an electron donor component less than 15 $mJ/m^2$ makes it possible to prevent $Fe^{2+}$ ions from being adsorbed on the face of the active surfaces. Indeed, unlike the tie phenomenon described in the documents of prior art, the hematite particles do not directly tie to the face of the actives surfaces, but they tie to $Fe^{2+}$ ions with are themselves adsorbed at the face of the active surfaces. Indeed, $Fe^{2+}$ ions are attracted by the negative electron donor face of the active surfaces. $Fe^{2+}$ is a Lewis acid, it reacts with the oxygen groups present on the face of the active surfaces and can in turn react with colloidal or particulate $Fe_2O_3$ which has a strong electron donor component. $Fe^{2+}$ ions can then adsorb at the face of the hematite particles and the reaction continues as a chain reaction, which causes the active surfaces to be fouled. Consequently, in order to prevent the active surfaces from being fouled, the applicant suggests that $Fe^{2+}$ ions should be prevented from adsorbing at the face of the active surfaces by covering this face with a protective layer.

The active surface according to the invention can also have one or more of the following characteristics taken individually or according to any technically possible combinations.

The active surface can be a floating active surface or a rotary active surface.

The material selected for the protective layer preferably has a surface energy greater than 35 mJ/m², and more preferably greater than 37 mJ/m², and even more advantageously greater than 50 mJ/m². Indeed, the greater the surface energy of the selected material, the more the face will be hydrated with a film of bound water which screens the face of $Fe^{2+}$ ions and prevents their adsorption. The material selected for the protective layer has preferably an electron donor component less than 10 mJ/m² and more preferably less than 5 mJ/m² in order to limit the interactions with $Fe^{2+}$ ions and prevent their adsorption. The electron donor component or basic component is determined by a contact angle with 3 liquids: bipolar, monopolar and non-polar liquids.

According to one embodiment, the material selected for the protective layer is nano- or micro-crystalline diamond, which has a surface energy of 50 mJ/m² and a low electron donor component of 3 mJ/m².

According to another embodiment, the material selected for the protective layer is titanium nitride (TiN) with a total surface energy of 44 mJ/m² and an electron donor component of 0.3 mJ/cm².

According to another embodiment, the material selected for the protective layer is chromium nitride (CrN) with a total surface energy of 41 mJ/m² and an electron donor component of 0.4 mJ/cm².

According to another embodiment, the material selected for the protective layer is chemical nickel (Ni), which has a surface energy of 33 mJ/m² and an electron donor component of 9 mJ/m².

According to another embodiment, the material selected for the protective layer is silicon carbide (SiC). Indeed, as a function of its composition, this material can have a sufficiently high surface energy to prevent $Fe^{2+}$ ions from being attracted by the face of the active surfaces and a sufficiently low electron donor component to limit the interactions between $Fe^{2+}$ ions and the face.

The invention is not limited to the mentioned layers.

Advantageously, the protective layer has a thickness greater than 100 nm so as to be continuous, and less than 100 μm so as to reduce the risk of crack and limit the disturbances in case of disconnection. The layer preferably has a thickness between 1 and 5 μm.

Advantageously, the active surfaces are made of silicon nitride.

The face of each active surface intended to be in contact with a water film is preferably totally covered with the protective layer.

According to one embodiment, the active surface can further be covered with a tie layer disposed between the protective layer and the face of the active surface. This tie layer enables the tying of the protecting layer to be improved. The composition of the tie layer depends on the composition of the protective layer.

According to one embodiment, the face of the active surface, and more precisely of the protective layer, is further micro- or nano-structured by an array of bumps, which bumps can be holes or pillars.

Each hole has side dimensions between 10 nm and 5 μm, and a depth of 10 nm to 5 μm. The distance between two consecutive holes is between 10 nm and 5 μm.

Each pillar has side dimensions between 10 nm and 5 μm. The aspect ratio, that is the height/side dimension ratio, must preferably be less than 2 and more preferably be less than 1 in order to avoid erosion phenomena. The distance between two consecutive pillars is between 10 nm and 5 μm.

This micro- or nano-structuration makes it possible to prevent $Fe_2O_3$ particles from tying to $Fe^{2+}$ ions by limiting the tie points in the case where $Fe^{2+}$ ions would nevertheless be tied to the face of the protective layer.

According to one embodiment, the face of at least one of the active surfaces, and more precisely of the protective layer can further have a hierarchical structuration. Microstructures of side dimensions between 500 nm and 5 μm and preferably between 1 μm and 2 μm can be covered with nanostructures of side dimensions between 10 nm and 200 nm and preferably between 50 nm and 100 nm. This double structuration also enables the tie points of $Fe_2O_3$ particles to be reduced in the case where $Fe^{2+}$ ions would nevertheless be tied to the face of the protective layer.

Another aspect of the invention also relates to a packing seal including at least one active surface according to the first aspect of the invention.

BRIEF DESCRIPTION OF THE DRAWINGS

Further characteristics and advantages of the invention will appear upon reading the detailed following description, with reference to the accompanied figures, which illustrate:

FIG. 1 is a cross-section view of a shaft sealing system according to one embodiment of the invention;

FIG. 2 is a schematic view of a seal n°1 according to one embodiment of the invention;

FIG. 3 is a schematic representation of the fouling phenomenon of a seal active surface;

For the sake of clarity, identical or similar elements are referenced by identical reference characters throughout the figures.

DETAILED DESCRIPTION

Figure 4:
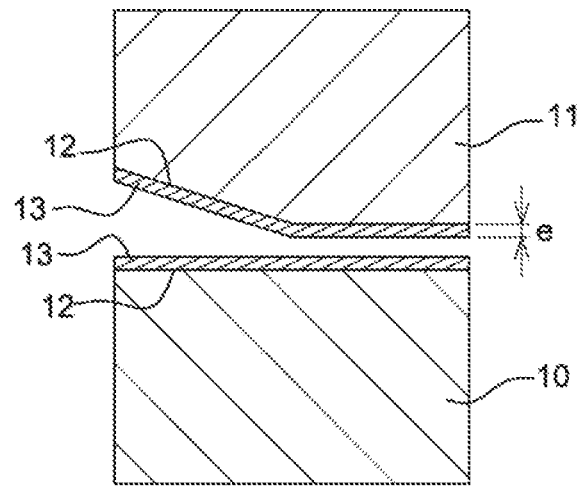
FIG. 4 is a cross-section schematic representation of the active surfaces of seal n°1 according to one embodiment of the invention.

FIG. 1 represents a system of mechanical packing seals for a shaft 4 of a primary motor-driven pump unit of a nuclear reactor. This shaft sealing system includes a seal n°1 referenced 1 in the figure, a seal n°2 referenced 2 in the figure, a seal n°3 referenced 3 in the figure. Each seal 1, 2, 3 is comprised of a rotary active surface attached to the shaft 7 and of a floating active surface that can follow the axial displacements of the shaft 7 but do not rotate.

Seal n°1 is more precisely represented in FIG. 2. Seal n°1 ensures the greatest part of the pressure drop between the primary circuit 8 and the atmosphere 9.

Seal n°1 is of the hydrostatic type, with a water film of a thickness in the order of 10 μm. Seal n°1 includes a rotary active surface 10 attached to the shaft 7 and a floating active surface 11 that can follow the axial displacements of the shaft 7. The leakage rate of seal n°1 is determined by the double gradient of the floating active surface 11 or by the gradients of the rotary 10 and floating 11 active surfaces. The active surfaces are made of silicon nitride $Si_3N_4$.

The fouling process of the active surfaces 10, 11 in the absence of the characteristics of the invention is explained in FIG. 3. Water circulates between the active surfaces 10, 11. This water brings $Fe^{2+}$ ions which preferably adsorb at the face of the active surfaces into $Si_3N_4$. $Fe^{2+}$ is a Lewis acid, it reacts with oxygen groups present on the face of the active surfaces and can in turn react with colloidal or particulate $Fe_2O_3$ which has a strong electron donor component. $Fe^{2+}$ ions can then adsorb at the face of the hematite particles and the reaction continues as a chain reaction, which causes the active surfaces to be fouled.

Figure 5:
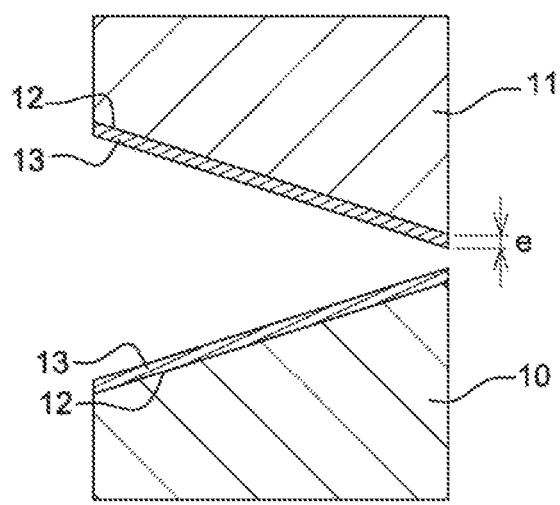
FIG. 5 is a cross-section schematic representation of the active surfaces of seal n°1 according to another embodiment of the invention.

In order to avoid this fouling process, with reference to FIGS. 4 and 5, the face 12 of at least one of the active surfaces 10, 11 is covered with a protective layer 13. This protective layer 13 is made of a material on which $Fe^{2+}$ ions seldom adsorb, if at all. To this end, the protective layer 13 is made of a material having a surface energy greater than 30 $mJ/m^2$ and an electron donor component less than 15 $mJ/m^2$.

The protective layer can thus be made of nano- or micro-crystalline diamond, which has a surface energy of 50 $mJ/m^2$ and a low electron donor component of 3 $mJ/m^2$.

A set of active surfaces covered with a carbon layer in the form of microcrystalline diamond of a 2 μm thickness has been tested on a model simulating the deposition in real conditions. For prior art raw active surfaces of silicon nitride, the deposition of iron oxide occurs after 250 h. When the active surfaces are covered with the carbon layer in the form of microcrystalline diamond of a 2 μm thickness, the deposition only occurs after 750 h. In this case, the deposition is strongly visually reduced with respect to an active surface of silicon nitride tested during 250 h.

The protective layer can also be made of titanium nitride which has a total surface energy of 44 $mJ/m^2$ and an electron donor component of 0.3 $mJ/cm^2$.

The protective layer can also be made of chromium nitride which has a total surface energy of 41 $mJ/m^2$ and an electron donor component of 0.4 $mJ/cm^2$.

The protective layer can also be made of chemical nickel, which has a surface energy of 33 $mJ/m^2$ and an electron donor component of 9 $mJ/m^2$. When the protective layer is made of nickel, a tie layer is preferably disposed between the face of the active surfaces and the protective layer so as to improve the strength of the protective layer and to initiate the autocatalytic reaction of nickel deposition. This tie layer is preferably made of platinum or of palladium.

The protective layer can also be made of silicon carbide (SiC). Silicon carbide can have a variable surface energy as a function of its composition, so that the silicon carbide composition is selected in order to have a surface energy greater than 30 $mJ/m^2$ and a sufficiently low electron donor component.

The material is not limited to the previously mentioned materials.

The protective layer preferably has a thickness greater than 100 nm so as to be continuous, and less than 100 μm so as to reduce the risk of crack and limit the disturbances in case of disconnection. Deposition preferably has a thickness between 1 and 5 μm.

Besides, the protective layer can be micro- or nano-structured by an array of holes or pillars.

Each hole has side dimensions between 10 nm and 5 μm, and a depth of 10 nm to 5 μm. The distance between two consecutive holes is between 10 nm and 5 μm.

Each pillar has side dimensions between 10 nm and 5 μm. The aspect ratio (height/side dimension ratio) must preferably be less than 2 and more preferably be less than 1 in order to avoid erosion phenomena. The distance between two consecutive pillars is between 10 nm and 5 μm. This micro- or nano-structuration makes it possible to prevent $Fe_2O_3$ particles from tying to $Fe^{2+}$ ions by limiting the tie points in the case where $Fe^{2+}$ ions would nevertheless be tied to the face of the protective layer.

The micro- or nano-structuration of the protective layer can be performed by lithography by using a mask of micro- or nano-particles or even by block copolymers or by any other known micro- or nano-structuration method.

Structuration can be hierarchical by combining microstructures and nanostructures.

In the case of nano- or micro-structuration, the protective layer is preferably put in place and then structured.

Of course, the invention is not limited to the embodiments described with reference to the figures and alternatives could be contemplated without departing from the scope of the invention. Especially, other materials than those mentioned in the detailed description could be used.

The invention claimed is:

1. A hydrostatic packing seal for a system for sealing the shaft of a primary motor-driven pump unit of a nuclear reactor configured to ensure sealing between the primary circuit and the atmosphere, the hydrostatic packing seal comprising:
   a rotary active surface attached to the shaft and a floating active surface, which is free to be displaced axially to follow axial displacements of the shaft, wherein the rotary active surface and the floating active surface face each other and are separated by a water film, said active surface having a face covered with a protective layer to prevent deposition of iron oxide fouling the active surface, said protective layer being made of a material having a surface energy greater than 30 $mJ/m^2$ and an electron donor component less than 15 $mJ/m^2$.

2. The hydrostatic packing seal according to the claim 1, wherein the material of the protective layer has a surface energy greater than 35 $mJ/m^2$.

3. The hydrostatic packing seal according to the claim 1, wherein the material of the protective layer has a surface energy greater than 37 $mJ/m^2$.

4. The hydrostatic packing seal according to the claim 1, wherein the material of the protective layer has a surface energy greater than 50 $mJ/m^2$.

5. The hydrostatic packing seal according to claim 1, wherein the material of the protective layer has an electron donor component less than 10 $mJ/m^2$.

6. The hydrostatic packing seal according to claim 1, wherein the material of the protective layer has an electron donor component less than 5 $mJ/m^2$.

7. The hydrostatic packing seal according to claim 1, wherein the protective layer is made of one of the following materials: silicon carbide, titanium nitride, chromium nitride, nickel, micro- or nano-crystalline diamond.

8. The hydrostatic packing seal according to claim 1, wherein the protective layer has a thickness (e) between 100 nm and 100 μm.

9. The hydrostatic packing seal according to claim 1, wherein the active surface is further covered with a tie layer disposed between the protective layer and the face of the active surface.

10. The hydrostatic packing seal according to claim 1, wherein the face of at least one of the active surfaces is further micro- or nano-structured by an array of bumps, each bump having side dimensions between 10 nm and 5 μm, a height between 10 nm and 5 μm, the distance between two consecutive bumps being between 10 nm and 5 μm.

11. A packing seal including at least one active surface according to claim 1.

* * * * *